May 9, 1950 G. F. MERTL ET AL 2,507,115
INDICATING INSTRUMENT
Filed March 24, 1948 2 Sheets-Sheet 1

Inventors:
Glen F. Mertl
Rudolf Knothe
By Hinkle, Horton, Ahlberg, Hansmann & Kupper
Attorneys.

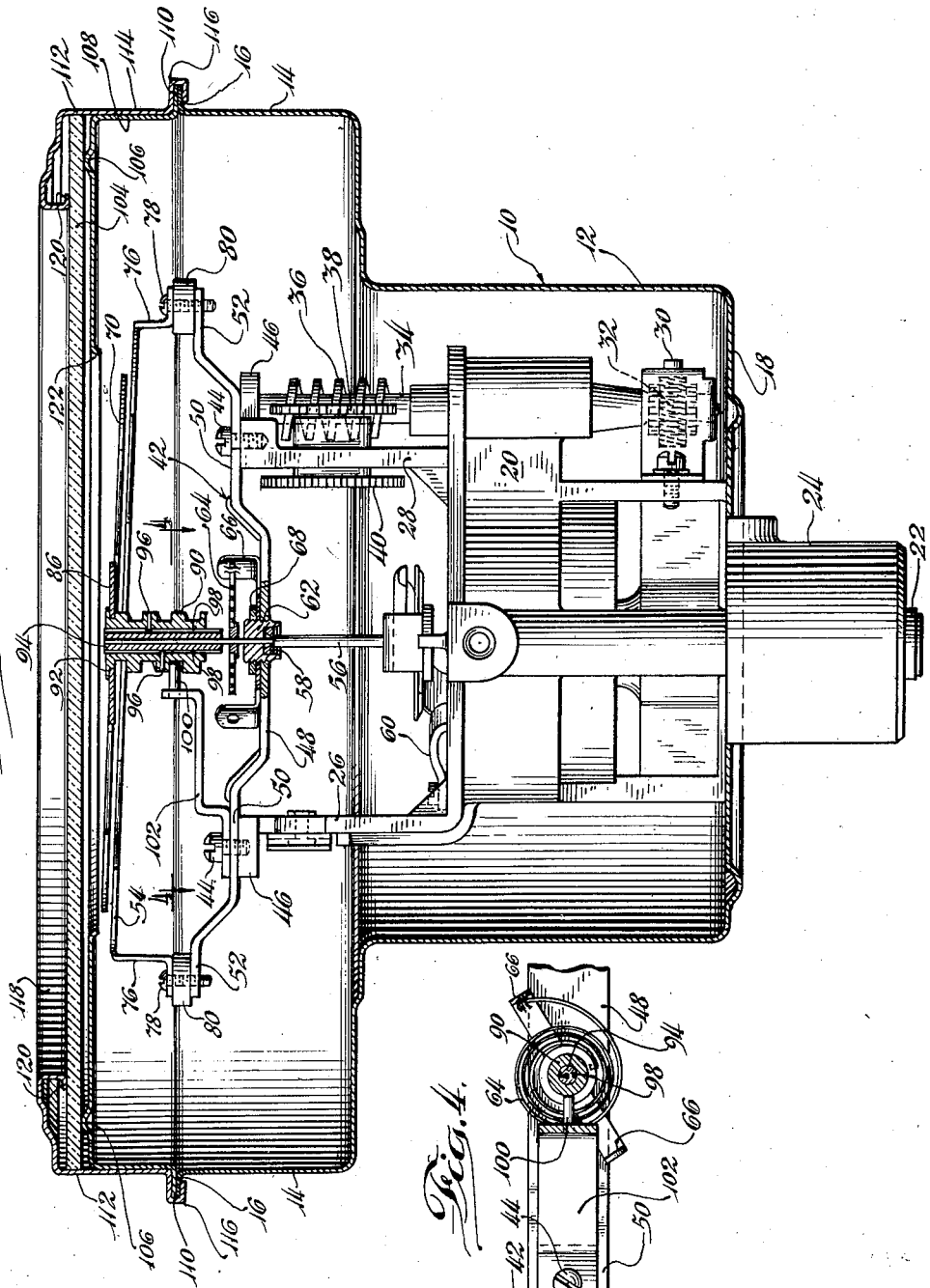

Patented May 9, 1950

2,507,115

UNITED STATES PATENT OFFICE 2,507,115

INDICATING INSTRUMENT

Glen F. Mertl and Rudolf Knothe, Chicago, Ill., assignors to Stewart-Warner Corporation, Chicago, Ill., a corporation of Virginia Application March 24, 1948, Serial No. 16,708

1 Claim. (Cl. 116—129)

The present invention relates to indicating instruments such as speedometers for automotive vehicles, and more particularly to an improved indicating means which is more readily observable and which includes means in addition to the conventional scale for giving a reading.

The conventional speedometer or other indicating instrument is equipped with a scale and a pointer forming an index which registers on this scale. These instruments often are hard to read, particularly under poor lighting conditions. The present invention is designed to overcome this disadvantage of conventional instruments by means of a new form of speed indicator cooperating with visible means in addition to the conventional indicia or scale for giving an indication of speed.

Accordingly it is an object of the invention to provide an indicating instrument having a new and improved indicator member for facilitating reading of the instrument.

Another object of the invention is the provision of a new and improved indicating instrument which incorporates means in addition to the conventional scale for giving a visual indication or reading.

A further object of the invention is the provision of a new and improved indicating instrument which includes a fixed scale and indicator members, one of which carries an index for registering on the scale and is disposed in overlying relation to the other member, which members are relatively movable to give a reading indicated by registration of the index on the scale and by the portion of the underlying member exposed to view. A band of color contrasting with the color of the indicating members preferably is provided on the underlying member to facilitate observation of the part thereof exposed to view.

A still further object of the invention is the provision of an improved indicating instrument as above set forth in which the indicator members conform in shape to a helix of less than 360 degrees in extent and the overlying member is movable and has an end which forms the index.

A more specific object of the invention is the provision of an improved indicating instrument as above set forth in which the indicator members conform in shape to a helix of less than 360 degrees but more than 180 degrees in extent and the overlying member is rotatable and is provided with means for moving the same axially upon rotation an amount approximating the lead of the indicator members over the distance the rotatable member is rotated so that the leading end of the rotatable member will be disposed under the end of the fixed member toward which it is advanced and thus the entire length of the fixed member uncovered will remain visible irrespective of the amount the rotatable member is rotated.

A more general object of the invention is the provision of an improved indicating instrument which is extremely simple, compact and inexpensive in construction and, therefore, easy to install and does not get out of order easily.

These and other objects of the invention will become apparent from the following description, wherein reference is had to the accompanying drawings, in which:

Fig. 3 is a vertical diametrical sectional view taken on the line 3—3 of Fig. 1; and Fig. 4 is a fragmentary sectional view taken on the line 4—4 of Fig. 3.

Figure 1:
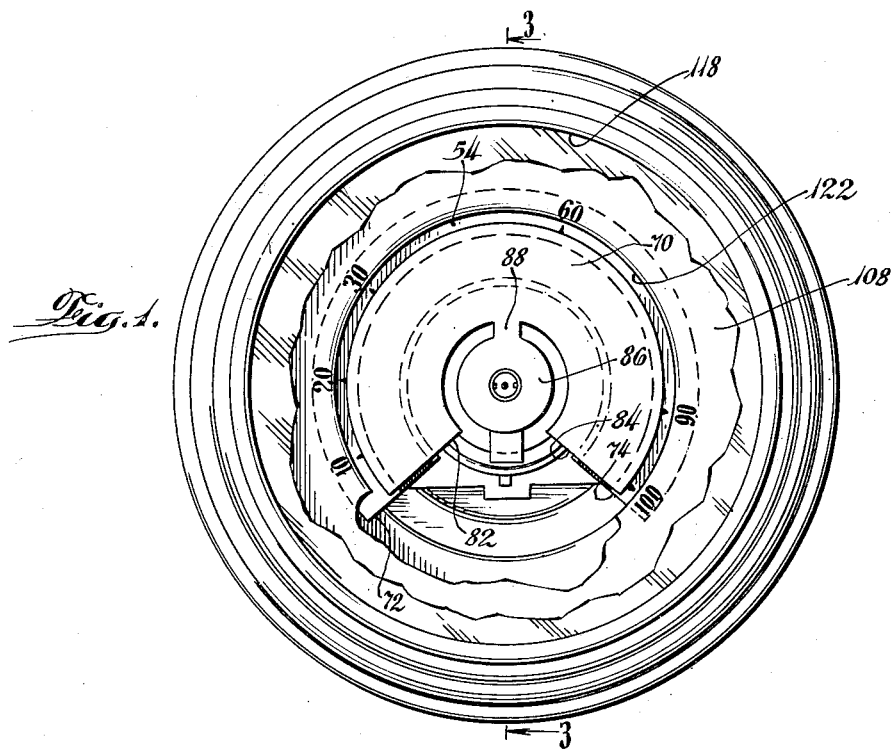
Fig. 1 is a front elevational view of an indicating instrument constructed in accordance with the principles of the present invention with a portion of the face plate broken away to show the indicator members in plan.

In order to illustrate the principles of the present invention it has been shown and will be described as applied to a speedometer for motor cars or trucks, but it is to be understood that the principles are applicable to other types of indicating instruments in addition to speedometers.

For the purpose of illustration a mechanically operated speedometer is shown enclosed within a generally ball shaped housing 10 (Fig. 3) which may be formed as a sheet metal stamping. This housing comprises a rear cup shaped part 12 of reduced diameter for housing the operating parts of the speedometer and a part 14 of enlarged diameter for housing the indicator members and the supports therefor. The peripheral edge of the enlarged part of the housing is bent outwardly to form a flange 16 for a purpose which will be described subsequently, and the reduced cup shaped part 12 has a back wall 18.

Supported upon the back wall 18 of the housing by any suitable means is a body casting 20 which supports the operating parts of the speedometer. Since these parts may be of conventional construction and form no part of the invention a detailed disclosure thereof is not thought to be necessary. In a conventional speedometer of this type a speed cup is rotatably secured in the casting for rotating a movable indicator member and this speed cup is rotated by magnetic forces acting thereon, which are produced by a rotatable cylindrical magnet. This magnet is driven by a shaft 22 projecting from the rear end of a rearwardly projecting extension 24 on the body casting. The shaft is separably connected by suitable means to a part of the vehicle transmission or any other rotating part of the vehicle which rotates in a constant predetermined speed relationship to the wheels of the vehicle in which the speedometer is mounted.

At its front end the body casting is formed with forwardly projecting bracket arms 26 and 28 adapted to support the speed indicating means and the odometer unit of the speedometer. This latter unit is not shown because it may be of conventional construction. Normally, it would be supported between the bracket arms 26 and 28 adjacent their forward ends and would be driven from the shaft 22 by conventional driving mechanism. Such a driving mechanism includes a cross shaft 30 having a worm 32 fixed thereon which engages a pinion fixed on the rear end of a shaft 34 extending longitudinally of the housing and suitably supported upon the body casting for rotational movement. At its forward end the shaft 34 carries a worm 36 which engages with a pinion 38 rotatably supported on the outer side of the bracket arm 28 and fixed to drive a second pinion 40 disposed on the inner side of the bracket arm. When the shaft 22 is rotated as a result of movement of the vehicle, the pinion 40 is rotated through the gear train above described and drives the odometer unit for indicating total mileage.

Also supported upon the forward end of the bracket arms 26 and 28 is a jewel supporting bracket 42 which is secured as by screws 44 to laterally projecting lugs 46 on the front ends of the bracket arms. The jewel bracket 42 may be formed from a sheet metal strap as indicated in Figs. 3 and 4 and it is preferably upwardly stepped intermediate its ends to provide a depressed central portion 48 and separate plane portions 50 spaced above the central portion which are secured to the lugs 46 on the bracket arms 26 and 28 for holding the jewel bracket in place as previously mentioned. The outer extremities 52 of the jewel bracket lie in a common plane elevated above the portions 50 and form supports for the stationary part of the speed indicating mechanism which comprises a dial plate 54 that forms one of the novel features of the present invention, as will appear hereinafter.

A speed indicator shaft 56 which is fixed to the speed cup previously mentioned is supported adjacent its forward or outer end in a jewel bearing 58 carried in the intermediate part of the depressed portion 48 of the jewel bracket. Adjacent its opposite end this shaft is supported within the confines of the speed cup by a second jewel bearing (not shown) carried in a bracket 60 having an arm depending from the forward end of the casting into the speed cup. These bearings may be of a known type and the outer bearing 58 is shown supported in a socket formed in a bearing cup 62 carried by the jewel bracket 42.

Rotational movement of the speed indicator shaft 56 from its predetermined zero position is resisted by a tensioned spiral hair spring 64 having its inner end secured to the shaft. The outer end of the spring is fixed to an arm on an adjustable spring adjuster 66 supported upon the intermediate portion 48 of the jewel bracket. This adjuster is rotatable relative to the speed indicator shaft so that the torque applied to the shaft 56 by the spring can be adjusted to insure accurate functioning of the speedometer and return of the shaft to its zero position. Releasable means such as a nut 68 is provided for locking the adjuster in position after the spring 64 has been properly tensioned.

Figure 2:
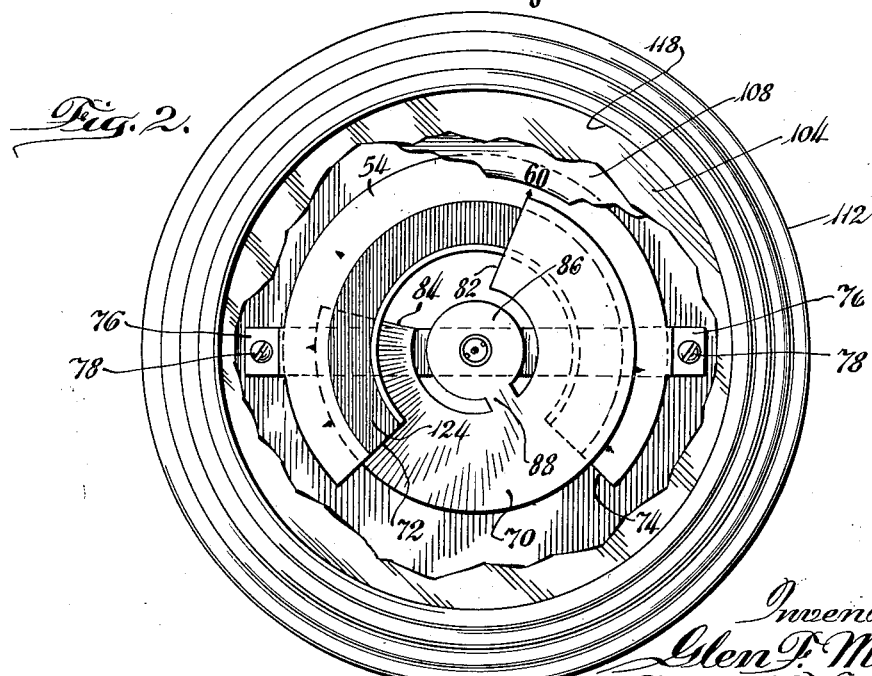
Fig. 2 is a front elevational view similar to Fig. 1 but with the indicating members moved to an indicating position.

The speed indicating means forming a novel feature of the present invention includes the fixed dial member 54 previously mentioned, and a movable speed indicator 70 which is rotated by the speed indicator shaft through means presently to be described. The fixed dial member 54 may be a sheet metal stamping having a configuration defining the major portion of an annulus. Radially extending edges 72 and 74 form the opposite ends of this dial member and define an open space behind which the odometer unit of the speedometer may be secured. From end to end the body of the dial member 54 is formed with a slight helical curve or pitch, and at diametrically opposite points on the periphery a pair of supporting brackets 76 are formed as shown in Figs. 2 and 3. These brackets are secured to the end portion 52 of the jewel bracket by means of screws 78, a washer 80 being interposed between the brackets and the end portions 52. It will be noted in Fig. 3 that the left side of the dial member is supported in a plane elevated above the right side because of the helical curvature in the body of the dial member.

Cooperating with this fixed dial member 54 is the speed indicator 70 which like the dial member has a configuration defining the major portion of an annulus of somewhat smaller diameter than the dial member as best seen in Fig. 2. The speed indicator has radially extending ends 82 and 84 and is curved from end to end to correspond with the curvature in the body of the dial member. Integrally formed with the annular part of the speed indicator 70 is a central disc-shaped part 86 connected to the annular part by a rib 88. The upper end of a worm 90 is received in an aperture in the disc and the parts are fixed with respect to each other by curling over the end of the worm, as indicated at 92 in Fig. 3. The disc and worm thus form a hub for the speed indicator which is operatively connected to the speed indicator shaft 56 for rotational movement therewith and axial movement relative thereto by means which will now be described.

Referring to Fig. 3, it will be seen that the speed indicator shaft 56 carries a bushing 94 press fitted or otherwise suitably secured on its outer end.

The speed indicator assembly comprising the annular speed indicator and worm are loosely received over the bushing and are fixed against rotation relative thereto by radially extending pins 96 in the worm having inner ends loosely received in axially extending slots 98 in the periphery of the bushing so that the speed indicator assembly is movable axially of the speed indicator shaft while it is being rotated by the latter.

Axial movement is imparted to this assembly by cam means which includes the worm 90 and a stationary pin 100 engaged with the worm and fixed to a bracket 102 secured to the bracket arm 26 on the body casting in overlying relation to the jewel bracket by means of the screw 44. Rotation of the speed indicator shaft from the zero position results in the speed indicator assembly being drawn downwardly by this cam means and in its being raised when the speed indicator assembly is returned to the zero position.

In order to protect the operating parts just described, the open front end of the housing is closed by a transparent dial plate 104 which rests upon an annular ridge 106 adjacent the periphery of a cup-shaped facing member 108. This member has a peripheral flange 110 which engages upon the flange 16 on the enlarged part of the housing. These members are fixed in position by a cylindrical bezel member 112 having a side wall 114 with a peripheral flange 116 formed thereon which engages upon the flange 110 on the facing member 108. The peripheral edges of the flange 116 on the bezel member are turned over the back side of the flange 18 on the housing to hold the parts in assembled relation as shown in Fig. 3. A circular sight opening 118 is defined by the inner periphery of the bezel member 112 and this periphery is generally channel-shaped in cross-section to provide an outwardly directed flange 120 for engaging the transparent plate 104. In the assembled instrument, the plate 104 is firmly clamped between the annular ridge 106 and the flange 120.

As indicated in Figs. 1 and 3, the facing member 108 has a circular opening 122 through which the fixed dial member 54 and the speed indicator 70 are visible, and along the periphery of this opening a scale is provided consisting of numbers as shown ranging in tens from zero to 100, for example, to indicate speed in miles per hour.

In assembling the instrument, the fixed dial member 54 is secured with its radial end 72 registering with the zero mark on the scale while the other end 74 may register with the highest mark on the scale. Likewise the speed indicator 70 is set with its radial end 82 registering with the zero on the scale so that in this position the speed indicator masks the dial member 54, and the end 82 of the indicator member forms an index for registering on the scale.

Upon rotation of the speed indicator shaft the speed indicator 70 is rotated and exposes a portion of the fixed dial member 54, the portion exposed being proportional to the speed at which the vehicle is traveling. Thus a visual indication of this speed is given not only by the registration of the index edge 82 on the scale, but also by the portion of the dial member 54 which is exposed. To facilitate observation the fixed dial member 54 is provided with a band 124 of contrasting color (Fig. 2) extending from end to end thereof.

As the speed indicator 70 is rotated, the pin 100 engaged with the worm 90 draws the worm and speed indicator downwardly on the bushing 94 an amount approximately the lead of this helically formed indicator member so that the leading end 84 of the indicator is lowered below the plane of the end 72 of the fixed dial member 54 and passes under this member as indicated in Fig. 2. Thus the uncovered portion of the band 124 remains visible irrespective of how far the indicator is rotated without there being any danger of the indicator wedging against the dial.

It will be apparent that the principles of the invention as applied to the speedometer described above are readily applicable to other forms of indicating instruments, and while the fixed and movable indicator members have been shown and described as annular, certain of the principles of the invention could be applied to instruments having indicator members of other shapes. It will also be apparent that other modifications and variations of the preferred embodiment of the invention described above can be made without departing from the underlying principles of the invention. We, therefore, desire by the following claim to include within the scope of the invention all such variations and modifications by which substantially the results of our invention may be obtained through the use of substantially the same or equivalent means.

We claim:

In an indicating instrument, indicating means including fixed and rotatable members each conforming in shape to a helix of less than 360 degrees in extent, said members being disposed in overlying relation one with respect to the other, means for rotating and axially moving said rotatable member to cover or expose a portion of the underlying member in proportion to the magnitude of the quantity being measured including a rotatable shaft, means for rotating said shaft in proportion to the magnitude of the quantity being measured, means journaling said shaft for rotation but inhibiting said shaft against endwise displacement, a worm secured to said rotatable member, said worm having substantially the same pitch and direction as said rotatable member, a fixed worm follower engaged with said worm to axially advance or retract said worm and rotatable member as said rotatable member is rotated, and means splining said rotatable shaft to said worm so as to rotate said shaft and worm together while not inhibiting axial displacement of said worm and rotatable member relative to said shaft.

GLEN F. MERTL.
RUDOLF KNOTHE.

REFERENCES CITED

The following references are of record in the file of this patent:

UNITED STATES PATENTS

| Number | Name | Date |
| --- | --- | --- |
| 201,637 | Treat | Mar. 26, 1878 |
| 1,468,235 | Japy | Sept. 18, 1923 |
| 2,011,517 | Geoffrion | Aug. 13, 1935 |
| 2,255,188 | Rieper | Sept. 9, 1941 |